United States Patent [19]

Onaka et al.

[11] Patent Number: 6,067,187

[45] Date of Patent: *May 23, 2000

[54] OPTICAL AMPLIFIER AND OPTICAL COMMUNICATION SYSTEM EMPLOYING THE SAME

[75] Inventors: Hiroshi Onaka; Hideyuki Miyata; Kazue Otsuka, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/754,843

[22] Filed: Nov. 22, 1996

[30] Foreign Application Priority Data

Nov. 29, 1995 [JP] Japan ................................. 7-311212

[51] Int. Cl.[7] ............................. H04B 10/00; H01S 3/30; G02B 6/22

[52] U.S. Cl. ......................... 359/341; 359/160; 359/194; 359/337

[58] Field of Search ..................................... 359/134, 160, 359/161, 174, 177, 194, 337, 341

[56] References Cited

U.S. PATENT DOCUMENTS

| | | | |
|---|---|---|---|
| 5,017,885 | 5/1991 | Saleh | 359/347 |
| 5,463,487 | 10/1995 | Epworth | 359/124 |
| 5,506,724 | 4/1996 | Shimiza et al. | 359/341 |
| 5,675,428 | 10/1997 | Henmi | 359/161 |
| 5,742,427 | 4/1998 | Kakui et al. | 359/341 |
| 5,764,406 | 6/1998 | Newhouse et al. | 359/341 |

OTHER PUBLICATIONS

Ellis et al, Electronics Letters, vol. 27, #3, pp 193–5; Abstract Only Herweith, Jan. 31, 1991.

Jaindot et al, CNET/LAB/QFE/CDO; DFMDC '95, vol. 2, pp 11.59–11.5/62; Abst. Only Herewith, Sep. 26, 1995.

*Primary Examiner*—Nelson Moskowitz
*Attorney, Agent, or Firm*—Staas & Halsey LLP

[57] ABSTRACT

An optical amplifier has an optical amplifying medium, a pump light source outputting pump light, and a first optical coupler for supplying the pump light to the optical amplifying medium. A probe light source outputs probe light having a wavelength included in an amplification band, a second optical coupler supplies the probe light to the optical amplifying medium, and detectors detect the powers of input signal light and the probe light, respectively. A control unit controls the power of the probe light according to outputs from the detectors. This structure makes it possible to provide an optical amplifier which can reduce the wavelength dependence of gain.

28 Claims, 16 Drawing Sheets

THE NUMBER OF OPTICAL AMPLIFIERS

OPTICAL AMPLIFIER AND OPTICAL COMMUNICATION SYSTEM EMPLOYING THE SAME

BACKGROUND OF THE INVENTION

1. Field of the Invention

The present invention relates to an optical amplifier suitable for simultaneous amplification of a plurality of wavelength-division multiplexed optical signals, and also to application of this optical amplifier to an optical communication system.

2. Description of the Related Art

For construction of a future multimedia network, an optical communication system having a larger capacity is demanded. Research is being intensively conducted on an optical communication system for realization of a very large capacity, such as a time-division multiplexing (TDM) system, an optical time-division multiplexing (OTDM) system, and a wavelength-division multiplexing (WDM) system. Of these systems, the WDM system is expected to realize a flexible lightwave network by utilizing a wide gain band of an erbium doped fiber amplifier (EDFA) to perform cross-connect and add/drop in an optical region or multiplexing of different kinds of services. The WDM system is considered more advantageous than the other systems in conducting very-large-capacity transmission by using an existing 1.3 μm-band zero dispersion single-mode fiber network that is now most widespread on a worldwide scale. This is due to the fact that the WDM system can realize a low transmission rate per each optical carrier and therefore set relatively large optical input power limited by permissible wavelength dispersion and the nonlinear effects of an optical fiber.

To realize the WDM system, an optical amplifier having a constant gain over a wide band is necessary. An EDFA has an amplification band (gain band) of about 1530 nm to about 1560 nm; however, the gain is not necessarily constant with respect to wavelength. That is, the gain of the EDFA changes depending on the wavelength of signal light.

As a technique for reducing the wavelength dependence of the gain of the EDFA, there has been proposed the use of a doped fiber doped with Al and Er (C. G. Alkins et al., Electron. Lett., vol.25, pp910–911 (1989)). Further, there have been proposed other techniques such as a method of optimizing an operation point of an EDFA (M. Suyama et al., OAA'93, MB5-1 (1993)) and a method of flattening gain characteristics by using an optical filter (H. Toba et al., IEEE Photon. Technol. Lett., vol.5, No.2, pp248 (1993)). However, the above-mentioned prior art techniques for reducing the wavelength dependence of gain have a defect such that the wavelength dependence of gain becomes large when the input power of signal light or the number of WDM channels changes, because of the presence of problems inherent to each technique.

SUMMARY OF THE INVENTION

It is therefore an object of the present invention to provide an optical amplifier which can reduce the wavelength dependence of gain irrespective of a change in input power and number of WDM channels.

It is another object of the present invention to provide an optical communication system to which this optical amplifier is applicable.

In accordance with a first aspect of the present invention, there is provided an optical amplifier having an amplification band for input signal light, for outputting amplified signal light. The optical amplifier comprises an optical amplifying medium to which the input signal light is supplied; a pump light source for outputting pump light; a first optical coupling means operatively connected to the optical amplifying medium and the pump light source, for introducing the pump light into the optical amplifying medium; a probe light source for outputting probe light having a wavelength included in the amplification band; a second optical coupling means operatively connected to the optical amplifying medium and the probe light source, for introducing the probe light into the optical amplifying medium; a first power detecting means for detecting power of the input signal light; a second power detecting means for detecting power of the probe light; and a control means for controlling the power of the probe light according to outputs from the first and second power detecting means to maintain constant an amplifier gain for the input signal light.

Preferably, the input signal light comprises a plurality of wavelength-division multiplexed optical signals.

Preferably, the optical amplifier further comprises a third power detecting means for detecting power of the amplified signal light, and a means for controlling power of the pump light so that an output from the third power detecting means becomes constant.

In the optical amplifier according to the first aspect of the present invention, the power of the probe light is controlled according to the results of detection of the powers of the input signal light and the probe light, to thereby maintain constant the amplifier gain for the input signal. Accordingly, the wavelength dependence of gain in a specific band can be substantially eliminated irrespective of a change in input power or the like.

In accordance with a second aspect of the present invention, there is provided an optical amplifier for amplifying wavelength-division multiplexed signal light and outputting amplified wavelength-division multiplexed signal light. The optical amplifier comprises an optical amplifying medium to which the wavelength-division multiplexed signal light is supplied; a means for pumping the optical amplifying medium; a monitor means for detecting a spectrum of the amplified wavelength-division multiplexed signal light output from the optical amplifying medium; and a parameter control means for controlling a parameter upon which gain characteristics representing a relation between gain of the optical amplifying medium and wavelength are dependent to maintain flat the gain characteristics in a band including wavelengths of the wavelength-division multiplexed signal light.

In the optical amplifier according to the second aspect of the present invention, the spectrum of the amplified wavelength-division multiplexed signal light is detected, and the parameter is controlled according to the spectrum detected. Accordingly, the wavelength dependence of gain can be substantially eliminated irrespective of a change in input power and number of WDM channels.

The optical communication system according to the present invention comprises a first terminal station for outputting wavelength-division multiplexed signal light, an optical repeater for amplifying the wavelength-division multiplexed signal light and outputting amplified wavelength-division multiplexed signal light, and a second terminal station for receiving the amplified wavelength-division multiplexed signal light output from the optical repeater. The first terminal station includes a means for modulating at least two channels of the wavelength-division multiplexed signal light by pilot signals having different frequencies. The optical repeater includes an optical amplifier according to the second aspect of the present invention. The monitor means of the optical amplifier includes a means for detecting components corresponding to the pilot signals, and the parameter control means of the optical amplifier includes a means for controlling the parameter so that amplitudes of the components detected by the detecting means become substantially equal to each other.

In the optical communication system according to the present invention, at least two channels of the wavelength-division multiplexed signal light are modulated by the pilot signals having different frequencies. Accordingly, by detecting the components corresponding to the pilot signals in the optical repeater, the spectrum of the amplified wavelength-division multiplexed signal light can be generally monitored. Each pilot signal may be used also as a low-frequency superimposing signal to be used for stabilization of the wavelengths of the wavelength-division multiplexed signal light in the first terminal station.

In accordance with another aspect of the present invention, there is provided an optical amplifier comprising: an optical amplifying medium for being supplied with an input signal light; a means for pumping the optical amplifying medium by supplying the optical amplifying medium with a pump light such that the optical amplifying medium has an amplification band for the input signal light; a means for supplying the optical amplifying medium with a probe light having a wavelength included in the amplification band; a means for detecting a power of at least one of the pump light and the probe light; and a means for controlling the power of the probe light based on the detected power.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
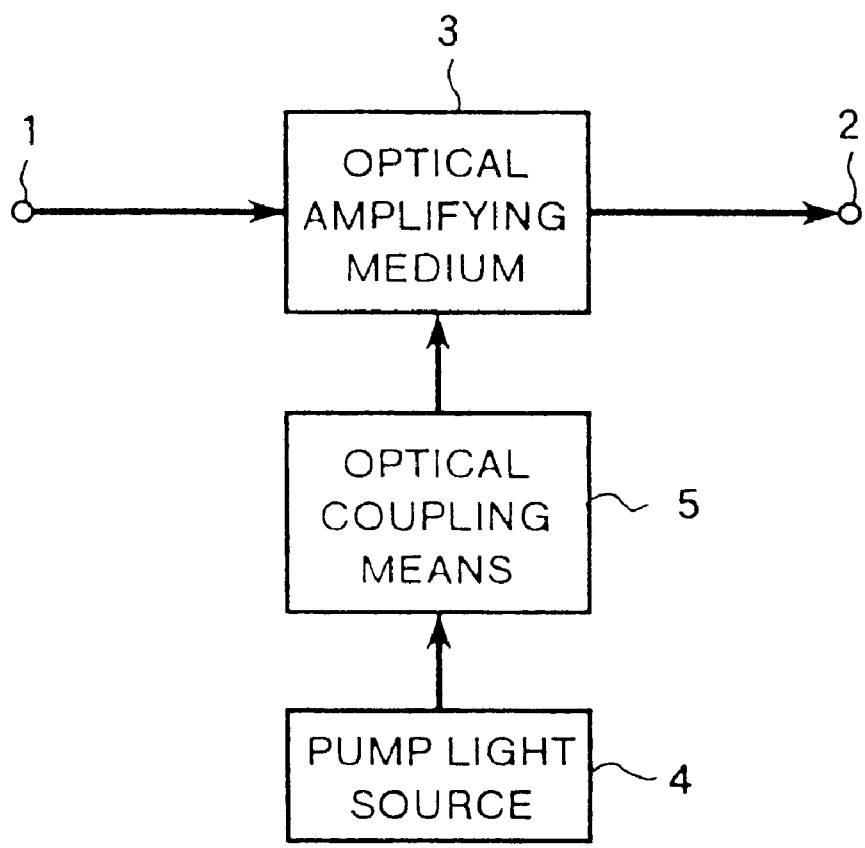
FIG. 1 is a block diagram showing a basic configuration of an optical amplifier to which the present invention is applicable.

FIG. 1 is a block diagram showing a basic configuration of an optical amplifier to which the present invention is applicable. This optical amplifier has an amplification band for input signal light to an input port 1, and outputs amplified signal light from an output port 2. The input signal light is supplied to an optical amplifying medium 3. In general, the optical amplifying medium 3 is a doped fiber doped with a rare earth element such as Er (erbium). Pump light from a pump light source 4 is introduced through optical coupling means 5 into the optical amplifying medium 3. Accordingly, the optical amplifying medium 3 becomes a pumped condition to exhibit an amplifying operation for signal light having a wavelength included in a specific band. In the case that the erbium doped fiber is pumped by pump light having a wavelength of 0.98 $\mu$m, signal light having a wavelength included in a band of 1.55 $\mu$m, is used. In the case that the signal light and the pump light propagate in the same direction in the optical amplifying medium 3, the optical coupling means 5 includes a WDM coupler provided between the input port 1 and the optical amplifying medium 3, for example, whereas in the case that the signal light and the pump light propagate in opposite directions in the optical amplifying medium 3, the optical coupling means 5 includes a WDM coupler provided between the optical amplifying medium 3 and the output port 2, for example.

Figure 2:
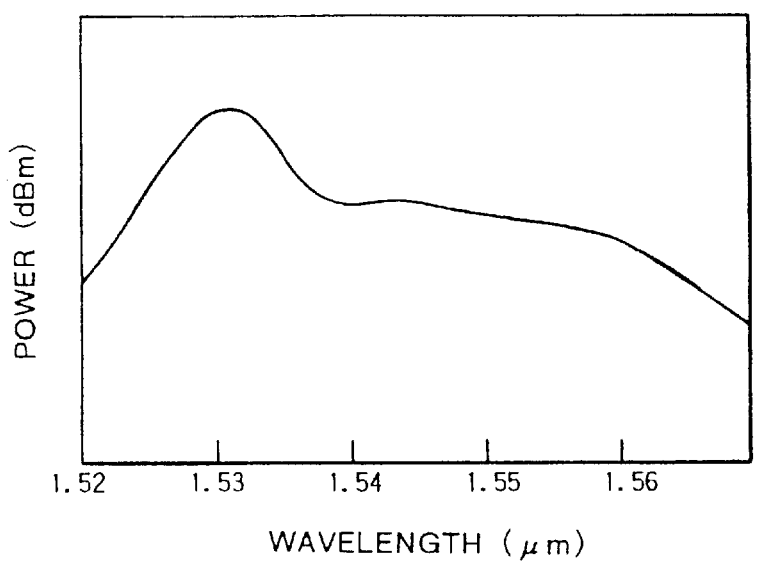
FIG. 2 is a graph showing a typical spectrum of ASE.

In taking an erbium doped fiber amplifier (EDFA) as an example, the characteristics thereof or the like will now be described. FIG. 2 is a graph showing a typical spectrum of ASE (Amplified Spontaneous Emission) in the EDFA. In FIG. 2, the vertical axis represents power (dBm) and the horizontal axis represents wavelength ($\mu$m). It is known that an ASE spectrum substantially reflects gain characteristics of an optical amplifier for a small signal. The gain characteristics represent the relation between gain in an optical amplifying medium and wavelength of input signal light. As understood from FIG. 2, a gain peak is present near 1.535 $\mu$m, that is, the gain characteristics are not flat.

Figure 3:
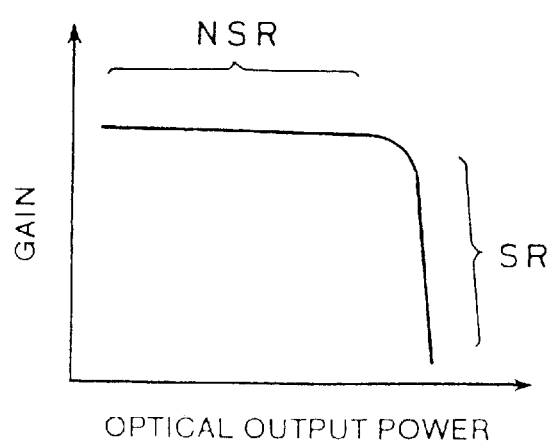
FIG. 3 is a graph showing the relation between gain and optical output power.

FIG. 3 is a graph showing the relation between optical amplifier gain and optical output power. An unsaturated region shown by NSR corresponds to a condition where the proportion of Er ions in a population inversion condition in the EDFA is large and a constant gain is therefore obtained irrespective of a change in optical output power. A saturated region shown by SR corresponds to a condition where the proportion of the Er ions in the population inversion condition is reduced and therefore the gain rapidly decreases with an increase in optical output power. Whether the gain is in the unsaturated region or in the saturated region is determined by the power of pump light, for example. In the case that the power of pump light is sufficient for input power, the proportion of the Er ions in the population inversion condition is large, so that the gain falls in the unsaturated region, whereas in the case that the power of pump light is small as compared with input power, the proportion of the Er ions in the population inversion condition is reduced, so that the gain falls in the saturated region.

Figure 4:
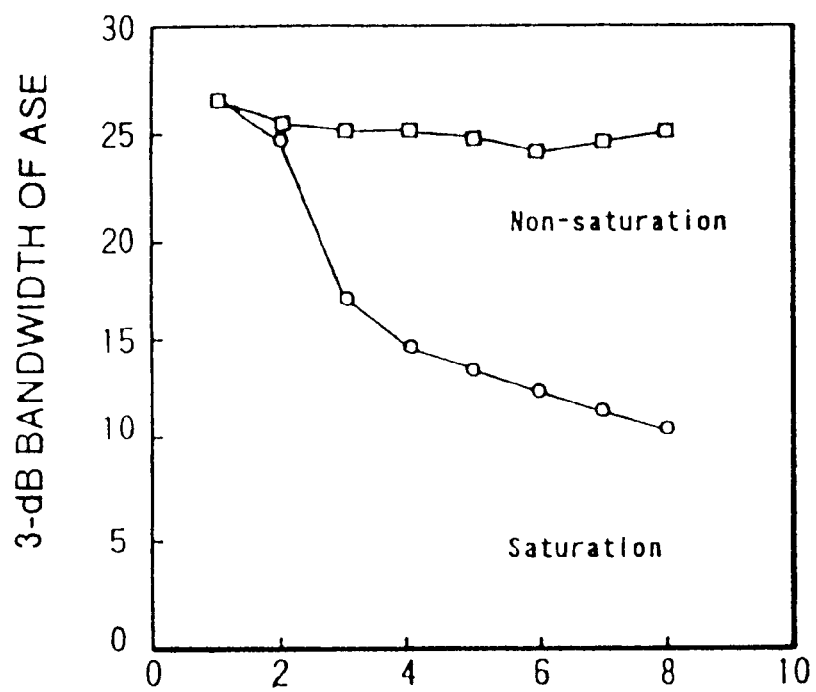
FIG. 4 is a graph showing the relation between 3-dB bandwidth of ASE and number of optical amplifiers.

An example of measurement of an ASE band when connecting a plurality of optical amplifiers operating in the unsaturated region and the saturated region will now be described with reference to FIG. 4. FIG. 4 is a graph showing the relation between 3-dB bandwidth (nm) of ASE and the number of optical amplifiers. The larger the 3-dB bandwidth, the flatter the gain characteristics. As apparent from FIG. 4, when the optical amplifiers operate in the unsaturated region, a reduction in the 3-dB bandwidth with an increase in the number of the optical amplifiers is small. On the other hand, when the optical amplifiers operate in the saturated region, the 3-dB bandwidth rapidly decreases with an increase in the number of the optical amplifiers. This shows that when WDM is applied to a multistage repeater system including a first terminal station having optical transmitters, a second terminal station having optical receivers, and a plurality of optical amplifiers (optical repeaters) provided between the first and second terminal stations, fatal effects such as a reduction in reception sensitivity appear because of unflatness of gain characteristics.

Figure 5:
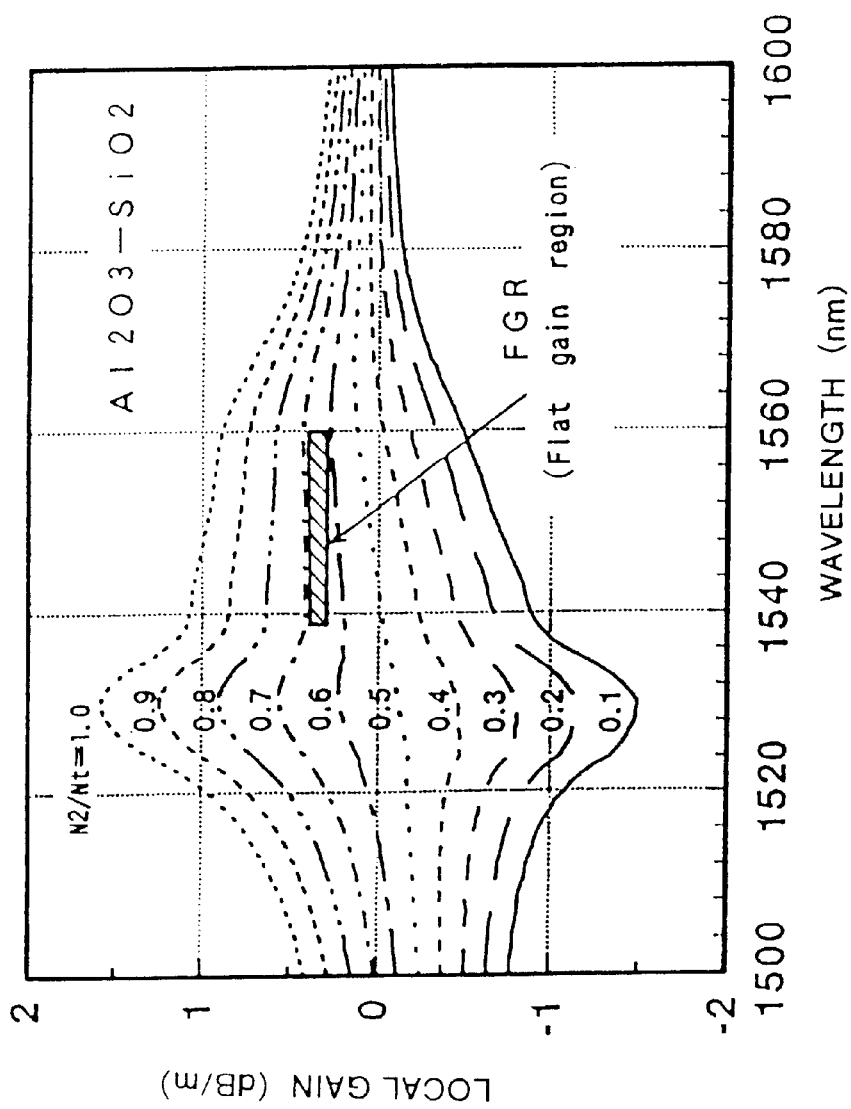
FIG. 5 is a graph showing a change in gain characteristics with a population inversion ratio (N2/Nt) used as a parameter.

FIG. 5 is a graph for illustrating a change in gain characteristics with the population inversion condition used as a parameter. In FIG. 5, the vertical axis represents local gain (dB/m) and the horizontal axis represents wavelength (nm). The parameter N2/Nt representing the population inversion condition shows the ratio of the number of Er ions in the population inversion condition to the number of total Er ions. In the case of N2/Nt=1, the total Er ions are shifted to an upper energy level, thus obtaining a complete population inversion. It is apparent that the gain characteristics continuously change with a change in N2/Nt.

In a typical EDFA, the power of pump light is controlled so that optical output power becomes constant. Further, the power of signal light input into the EDFA changes according to use conditions and age deterioration of the system. If the power of pump light is controlled according to this change in input signal light power so that optical output power becomes constant, the population inversion condition changes to result in a large change in gain characteristics, i.e., in wavelength dependence of gain. This is due to the fact that the gain characteristics largely depend on the power of pump light as previously described with reference to FIG. 3. Accordingly, a conventional technique using an optical filter to make the gain characteristics flat requires control of changing the characteristics of the optical filter according to optical input power, causing a remarkably complex configuration of the system.

As apparent from FIG. 5, flat gain characteristics are obtained in the vicinity of N2/Nt=0.7 for a band of 1540–1560 nm. Accordingly, if the operational condition of the EDFA can be maintained always in this population inversion condition, the wavelength dependence of gain can be eliminated.

For example, a technique of maintaining the gain of an optical amplifier constant by optimally controlling the power of pump light is described in Technical Research Report of Electronic Information Communication Society, OCS 94–96, pp31–36.

Figure 6:
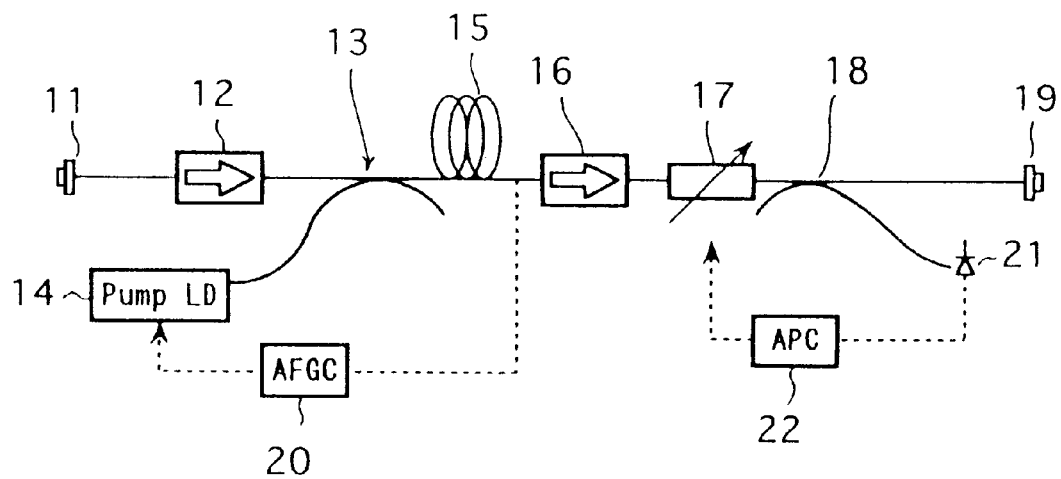
FIG. 6 is a block diagram showing a prior art configuration for maintaining the gain constant.

FIG. 6 is a block diagram showing a conventional technique of maintaining the gain constant. Signal light from an input port 11 is supplied through an optical isolator 12 to a WDM coupler 13. Pump light from a pump LD 14 is added to the signal light in the WDM coupler 13, and both the signal light and the pump light are input to an EDF (erbium doped fiber) 15. The signal light amplified in the EDF 15 is passed through an optical isolator 16, an optical attenuator 17, and an optical coupler 18 in this order, and is output from an output port 19. A drive current for the pump LD 14 is controlled by an automatic fiber gain controller (AFGC) 20. The gain controller 20 controls the power of the pump light so that the gain in the EDF 15 becomes constant, according to the power of ASE output from the EDF 15, for example. A part of the amplified signal light is branched off in the optical coupler 18, and the branch light is converted into an electrical signal by a photodetector 21. An automatic power controller (APC) 22 controls the attenuation factor of the optical attenuator 17 so that the level of an output signal from the photodetector 21 becomes constant.

A point to be noted in the optical amplifier shown in FIG. 6 is that the power of the pump light is controlled, so as to maintain the gain in the EDF 15 constant. To perform automatic power control (APC) for maintaining the output power of the optical amplifier constant, the signal light amplified by the EDF 15 is attenuated intentionally by the optical attenuator 17 with the attenuation factor controlled. Accordingly, this conventional technique has defects such that a reduction in maximum optical output power due to the use of the optical attenuator and an increase in cost due to the use of the optical attenuator of the variable attenuation factor type.

Figure 7:
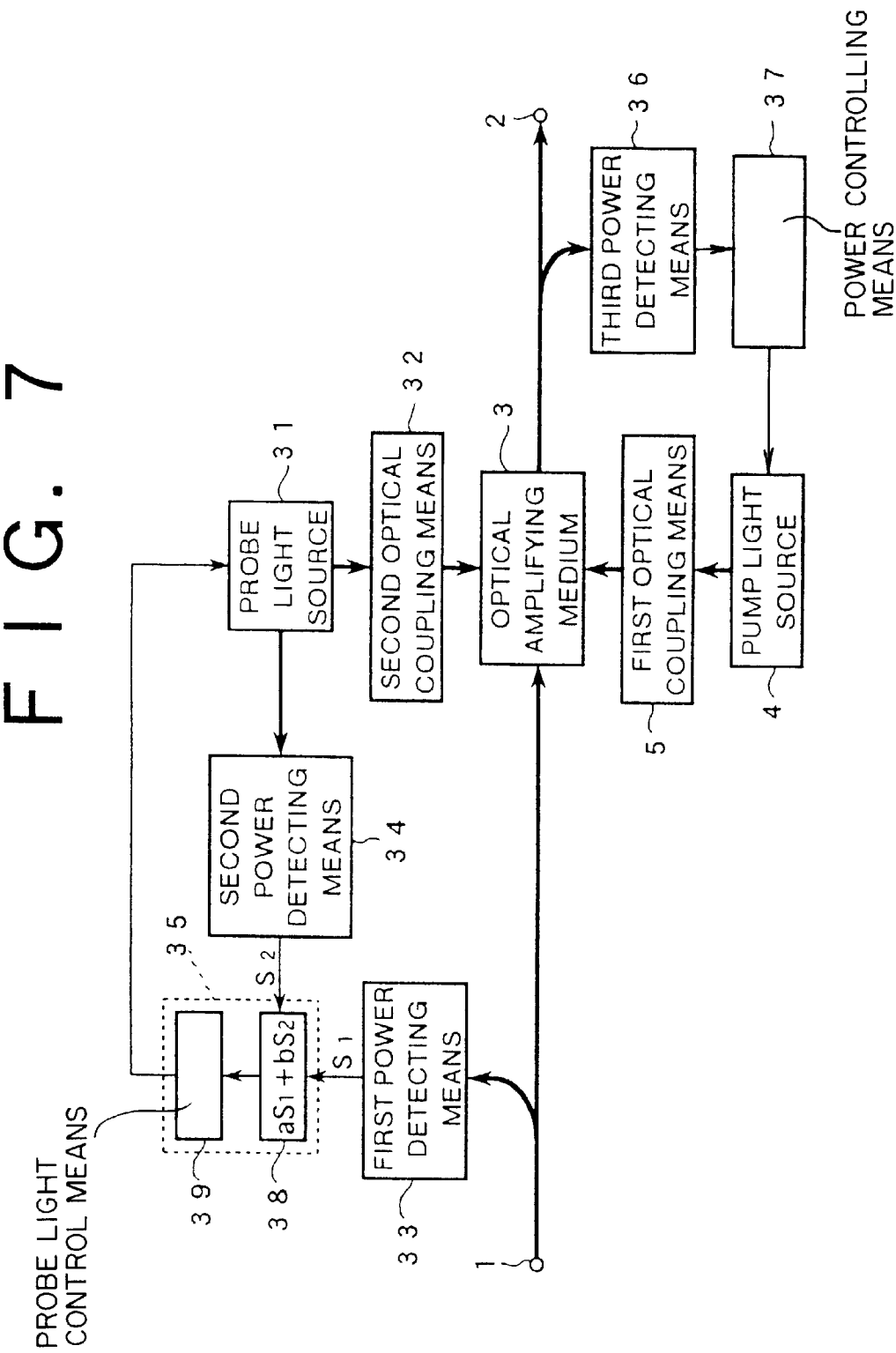
FIG. 7 is a block diagram showing a basic configuration of an optical amplifier according to the first aspect of the present invention.

FIG. 7 is a block diagram showing a basic configuration of an optical amplifier according to the first aspect of the present invention. Like the configuration shown in FIG. 1, the optical amplifier shown in FIG. 7 includes an input port 1, an output port 2, and an optical amplifying medium 3 provided in a main optical path between the input port 1 and the output port 2. Pump light from a pump light source 4 is introduced into the optical amplifying medium 3 by first optical coupling means 5. The basic configuration shown in FIG. 7 further includes a probe light source 31, second optical coupling means 32 for introducing probe light from the probe light source 31 into the optical amplifying medium 3, first power detecting means 33 for detecting the power of input signal light, second power detecting means 34 for detecting the power of the probe light, and control means 35 for controlling the power of the probe light according to outputs from the first and second power detecting means 33 and 34. The wavelength of the probe light to be output from the probe light source 31 is included in the amplification band of the optical amplifying medium 3. Preferably, the wavelength of the probe light is different from the wavelength of the signal light. As result of control by the control means 35, the amplifier gain of the optical amplifying medium for the input signal light is maintained constant.

Preferably, this basic configuration further includes third power detecting means 36 for detecting the power of the signal light amplified in the optical amplifying medium 3 and means 37 for controlling the power of the pump light so that an output from the third power detecting means 36 becomes constant.

Preferably, the control means 35 includes computing means 38 for performing computation according to the outputs from the power detecting means 33 and 34 and outputting a result of this computation, and means 39 for controlling the probe light source 31 so that the output from the computing means 38 becomes constant. For example, the computing means 38 adds a value $aS_1$ obtained by multiplying an output $S_1$ from the first power detecting means 33 by a first constant a to a value $bS_2$ obtained by multiplying an output $S_2$ from the second power detecting means 34 by a second constant b, and outputs a signal having a level corresponding to the sum $(aS_1+bS_2)$. Then, the means 39 controls the probe light source 31 so that the level becomes constant.

The means 36 and 37 are provided to perform APC for maintaining the output power of this optical amplifier constant. Since the power of the pump light is controlled by APC in this configuration, the population inversion ratio N2/Nt is accordingly changed. As a result, as apparent from FIG. 5, the pump light power controlled by APC changes the wavelength dependence of gain.

According to the first aspect of the present invention, the power of the probe light is controlled, so as to maintain the wavelength dependence of gain constant. That is, by changing N2/Nt according to the power of the probe light independently of a change in N2/Nt due to the control of the pump light power by APC, the wavelength dependence of gain is maintained constant. Specifically, conditions are set in the following manner, for example. The power of the probe light is preset equal to a nearly intermediate value in a controllable range when the power of the input signal light is a nearly intermediate value between a maximum value and a minimum value in a power change range (including a change in the number of channels in the case of applying WDM). Under this set condition, a parameter of the optical amplifying medium 3 and the power of the pump light are set so that the output power of the optical amplifier becomes a predetermined value and the gain characteristics become flat. The parameter of the optical amplifying medium 3 is the length of an EDF or the concentration of Er ions as a dopant in the EDF, for example. The maximum output of the pump light source 4 is set preferably so that power enough to obtain an optical output having the predetermined power mentioned above remains even when the power of the input signal light becomes the minimum value.

By setting the conditions as mentioned above, N2/Nt can be controlled to become a constant value of 0.7, for example. When N2/Nt is maintained a substantially constant value around 0.7, constant gain characteristics can be obtained for signal light having a wavelength included in a flat gain region shown by FGR in FIG. 5. In the example of FIG. 5, the flat gain region FGR is a range of 1540–1560 nm.

In the case that the power of the input signal light changes in its decreasing direction, the number of Er ions in the population inversion condition increases to cause a increase in value of N2/Nt, so that the gain on the shorter wavelength side becomes larger than the gain on the longer wavelength side (see FIG. 5). Accordingly, by increasing the power of the probe light according to the decrease in the power of the input signal light, the value of N2/Nt can be returned to 0.7, thereby maintaining flat gain characteristics. In contrast, when the power of the input signal light changes in its increasing direction, the number of Er ions in the population inversion condition decreases to cause a decrease in value of N2/Nt (see FIG. 5), so that the gain on the longer wavelength side becomes larger than the gain on the shorter wavelength side. Accordingly, by reducing the power of the probe light according to the increase in the power of the input signal light, the value of N2/Nt can be maintained at 0.7.

By performing control such that the powers of the signal light and the probe light to be supplied to the optical amplifying medium 3 become substantially constant, the value of N2/Nt can be maintained substantially constant. The above-mentioned example of computation in the computing means 38 is suitable for realizing such control as performing compensation for loss or the like.

Figure 8:
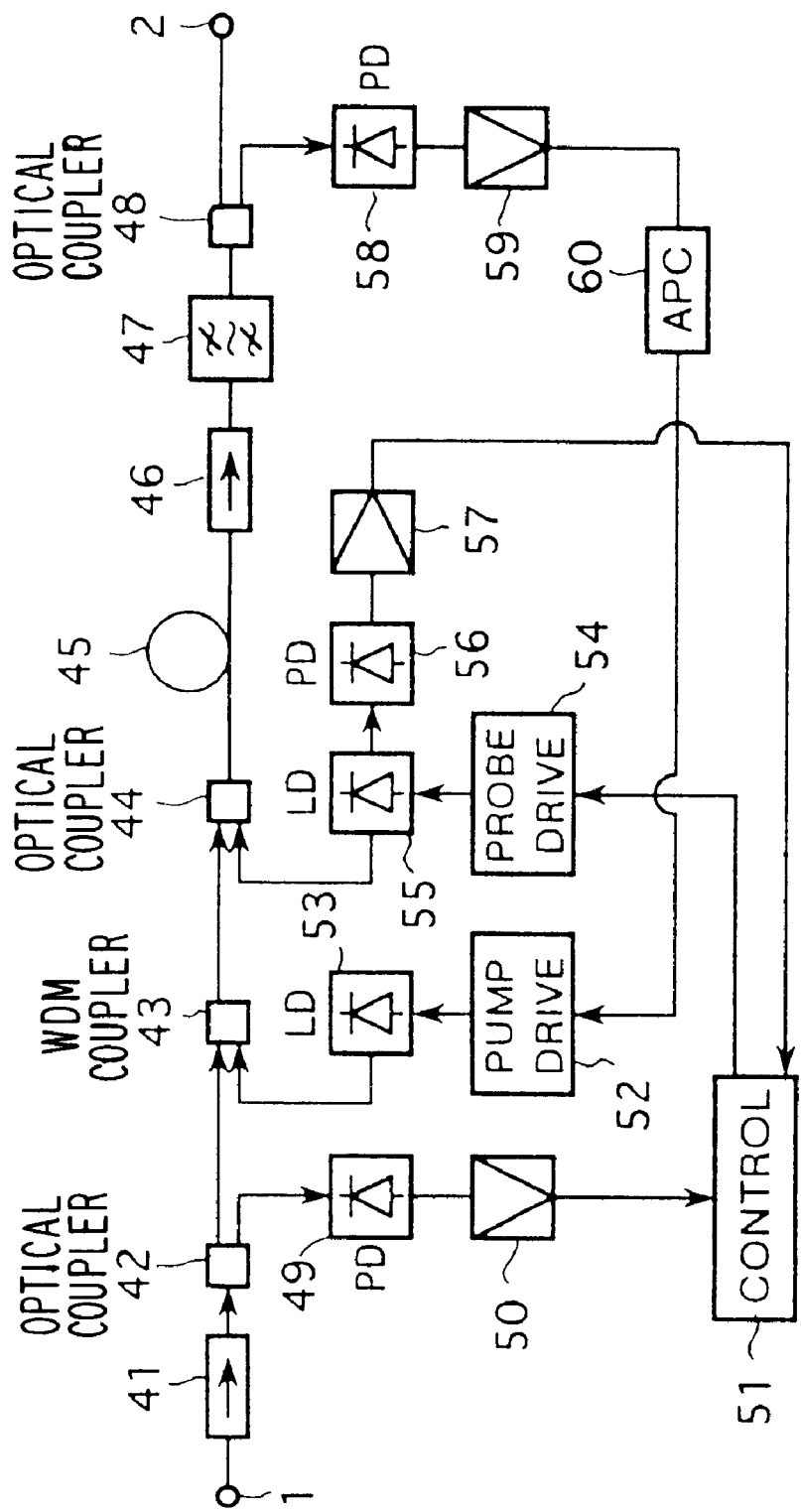
FIG. 8 is a block diagram showing a first preferred embodiment of the optical amplifier shown in FIG. 7.

FIG. 8 is a block diagram showing a first preferred embodiment of the optical amplifier shown in FIG. 7. An optical isolator 41, an optical coupler 42, a WDM coupler 43, an optical coupler 44, an EDF 45, an optical isolator 46, an optical band-pass filter 47, and an optical coupler 48 are optically connected in this order between an input port 1 and an output port 2, thereby forming a main optical path of signal light. The optical coupler 42 is provided to branch off a part of the input signal light. The branch light is converted into an electrical signal by a photodetector (photodiode) 49, and the electrical signal is supplied through an amplifier 50 to a control circuit 51. Pump light from a laser diode 53 being driven by a pump drive circuit 52 is introduced into the main optical path by the WDM coupler 43, and is next supplied through the optical coupler 44 to a first end of the EDF 45. The first end of the EDF 45 is located on the upstream side of the main optical path, and a second end of the EDF 45 is located on the downstream side of the main optical path.

Probe light from a laser diode 55 being driven by a probe drive circuit 54 is introduced into the main optical path by the optical coupler 44, and is next supplied to the first end of the EDF 45. The laser diode 55 outputs forward light and backward light whose powers are equal to each other or change in proportion to each other. In this preferred embodiment, the forward light is used as the probe light. The backward light is converted into an electrical signal by a photodetector 56, and the electrical signal is supplied through an amplifier 57 to the control circuit 51.

The optical band-pass filter 47 transmits the signal light amplified in the EDF 45 and substantially cuts off the probe light amplified in the EDF 45. The optical band-pass filter 47 further cuts off the residual pump light not consumed in the optical amplification process in the EDF 45. A part of the light transmitted through the optical band-pass filter 47 is branched off by the optical coupler 48, and is next converted into an electrical signal by a photodetector 58. This electrical signal is supplied through an amplifier 59 to an APC circuit 60. A current to be supplied from the probe drive circuit 54 to the laser diode 55 is controlled by the control circuit 51, and a current to be supplied from the pump drive circuit 52 to the laser diode 53 is controlled by the APC circuit 60.

Throughout the drawings, substantially the same parts are denoted by the same reference numerals. The correspondence between the parts shown in FIG. 7 and the parts shown in FIG. 8 is as follows:

The first power detecting means 33 corresponds to the optical coupler 42, the photodetector 49, and the amplifier 50. The second power detecting means 34 corresponds to the photodetector 56 and the amplifier 57. The control means 35 corresponds to the control circuit 51. The probe light source 31 corresponds to the probe drive circuit 54 and the laser diode 55. The second optical coupling means 32 corresponds to the optical coupler 44. The optical amplifying medium 3 corresponds to the EDF 45. The first optical coupling means 5 corresponds to the WDM coupler 43. The pump light source 4 corresponds to the pump drive circuit 52 and the laser diode 53. The third power detecting means 36 corresponds to the optical band-pass filter 47, the optical coupler 48, the photodetector 58, and the amplifier 59. The means 37 corresponds to the APC circuit 60.

In the case that the computing means 38 shown in FIG. 7 performs the above-illustrated computation, it is required to detect the powers of the amplified signal light and the amplified probe light and the power of an ASE component output from the optical amplifying medium, and perform control such that the sum of these powers becomes constant in order to maintain N2/Nt accurately constant. In this case, the total input power into the optical amplifying medium is maintained constant by the control of the probe light, and the total optical output from the optical amplifier is maintained constant. As a result, this optical amplifier can maintain a constant gain, so that N2/Nt can be maintained constant.

In the preferred embodiment shown in FIG. 8, the third power detecting means 36 (see FIG. 7) includes the optical band-pass filter 47, and the optical band-pass filter 47 removes the amplified probe light. Accordingly, the APC circuit 60 controls the pump light so that the power of the amplified signal light passed through the optical band-pass filter 47 and the power of the ASE component generating in a band near the wavelength of the amplified signal light are maintained constant. As a result, there is a possibility that it may be difficult to maintain N2/Nt always constant in the case that the dynamic range of the power of the input signal light is large. A preferred embodiment intended to cope with this problem will be described with reference to FIG. 9.

Figure 9:
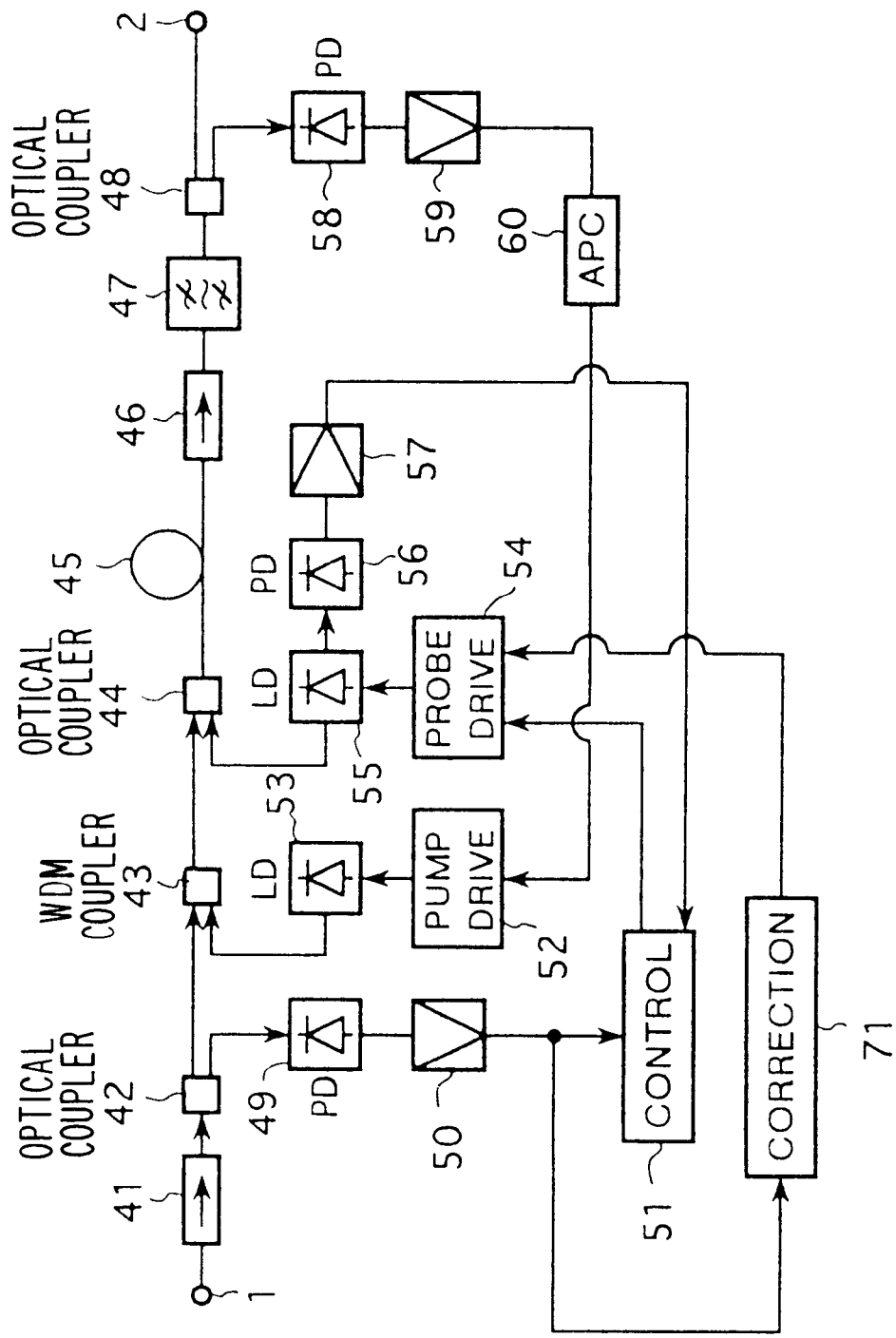
FIG. 9 is a block diagram showing a second preferred embodiment of the optical amplifier shown in FIG. 7.

FIG. 9 is a block diagram showing a second preferred embodiment of the optical amplifier shown in FIG. 7. In contrast with the first preferred embodiment shown in FIG. 8, the optical amplifier shown in FIG. 9 is characterized in that a correcting circuit 71 is additionally provided. The correcting circuit 71 receives an output signal from the amplifier 50, that is, an output signal from the first power detecting means (see FIG. 7) and corrects a current to be supplied from the probe drive circuit 54 to the laser diode 55. Accordingly, the power of the probe light to be supplied to the EDF 45 can be corrected to substantially widen a band where a change in amplifier gain depending on wavelength does not occur.

Figure 10:
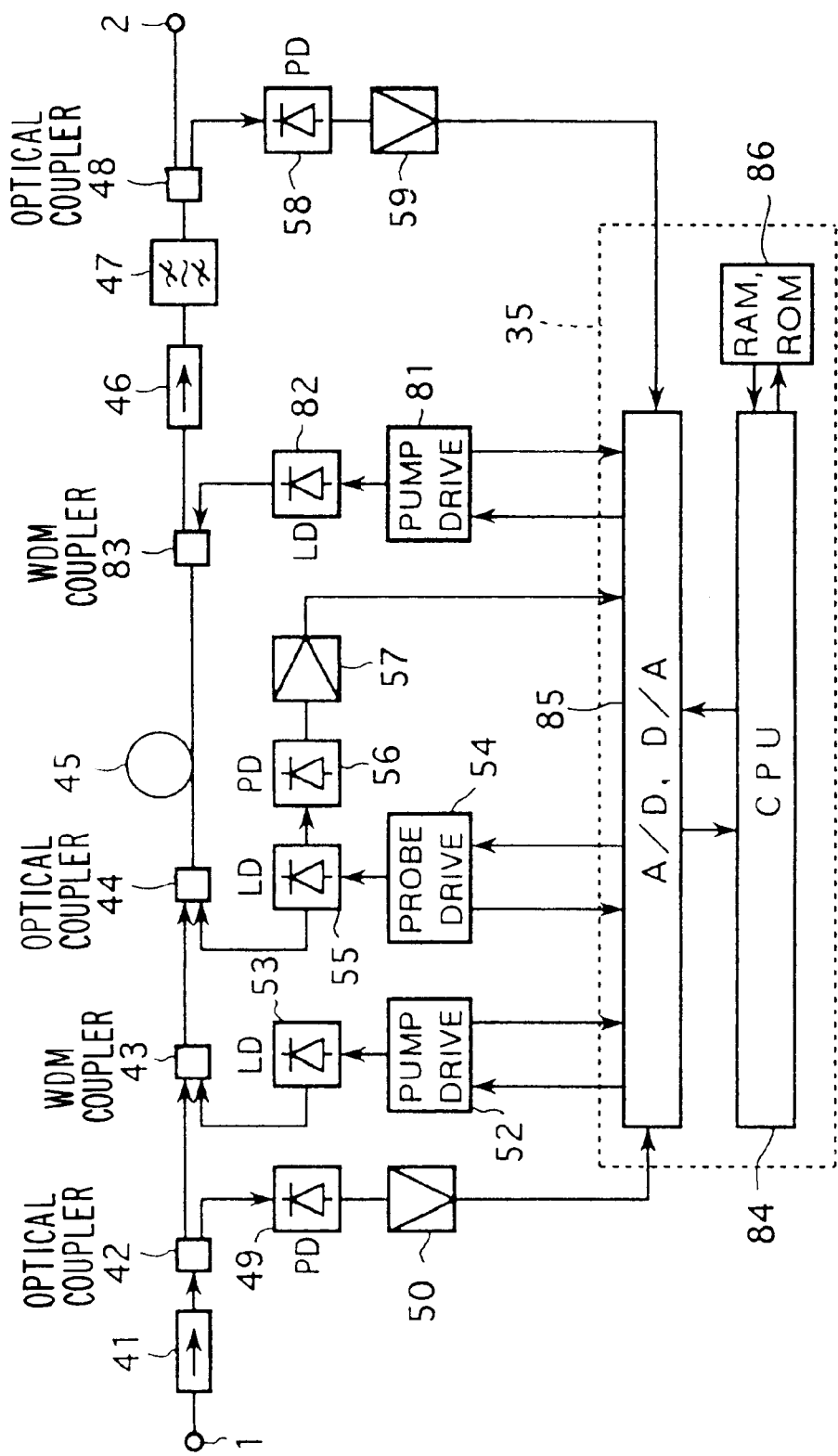
FIG. 10 is a block diagram showing a third preferred embodiment of the optical amplifier shown in FIG. 7.

FIG. 10 is a block diagram showing a third preferred embodiment of the optical amplifier shown in FIG. 7. In contrast with the first preferred embodiment shown in FIG. 8, the optical amplifier shown in FIG. 10 is characterized by the following points.

As a first characterizing point, the pump light source 4 (see FIG. 7) includes a laser diode 82 to be driven by a pump drive circuit 81 in addition to the laser diode 53. With this change, there is further provided a WDM coupler 83 for introducing pump light from the laser diode 82 into the EDF 45 from its second end. The WDM coupler 83 is provided between the EDF 45 and the optical isolator 46. In this preferred embodiment, the WDM couplers 43 and 83 correspond to the first optical coupling means 5 shown in FIG. 7.

As a second characterizing point, the control means 35 includes a CPU (Central Processing Unit) 84 for calculating the optimum power of the probe light according to a predetermined program. The input/output signals into/from the pump drive circuits 52 and 81 and the probe drive circuit 54 and the output signals from the amplifiers 50 and 59 are all analog signals. Accordingly, to adapt these analog signals to a digital signal processing in the CPU 84, the control means 35 further includes a converter 85 for performing analog/digital conversion and digital/analog conversion. The CPU 84 is connected to a memory circuit 86 including a ROM for permanently storing a program and a RAM for temporarily storing a result of calculation or the like. The CPU 84 is provided not only for calculation of the optimum power of the probe light, but also for control of the power of the pump light for APC. As a modification, the WDM coupler 43, the pump drive circuit 52, and the laser diode 53 may be omitted to thereby allow the pump light to be supplied into the EDF 45 from its second end only.

Figure 11:
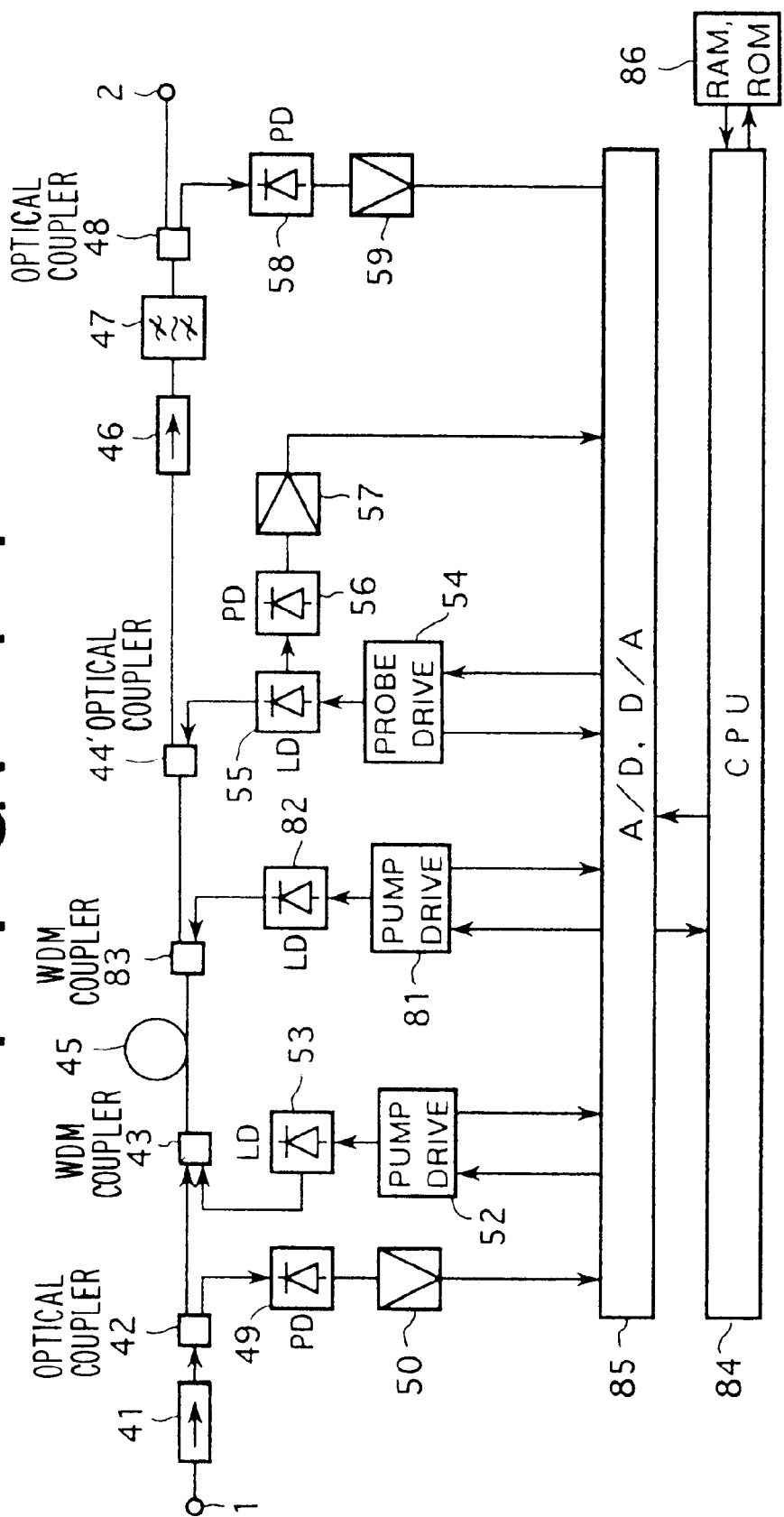
FIG. 11 is a block diagram showing a fourth preferred embodiment of the optical amplifier shown in FIG. 7.

FIG. 11 is a block diagram showing a fourth preferred embodiment of the optical amplifier shown in FIG. 7. The fourth preferred embodiment shown in FIG. 11 is the same as the third preferred embodiment shown in FIG. 10 in the point that the first optical coupling means 5 (see FIG. 7) includes the WDM couplers 43 and 83. In contrast with the third preferred embodiment shown in FIG. 10, the optical amplifier shown in FIG. 11 is characterized in that the second optical coupling means 32 (see FIG. 7) includes an optical coupler 44' operatively connected to the EDF 45.

In the specification of the present invention, the wording that optical components are operatively connected to each other includes the case that the optical components are directly connected together by fiber connection or spatial connection using a collimated beam, and further includes the case that the optical components are connected through another optical component such as an optical filter.

The optical coupler 44' is provided between the WDM coupler 83 and the optical isolator 46. The probe light from the laser diode 55 is supplied through the optical coupler 44' and the WDM coupler 83 in this order into the EDF 45 from its second end. Power control for the probe light is similar to that in the previous preferred embodiments. In this preferred embodiment, the optical coupler 44' is provided downstream of the EDF 45 in the main optical path. Therefore, the probe light propagates in a direction opposite to the propagation direction of the signal light in the main optical path. Accordingly, the probe light toward the output port 2 or the photodetector 58 can be easily cut off. More specifically, in the case that the wavelength of the probe light is very close to the wavelength of the signal light, the design accuracy of the pass band of the optical band-pass filter 47 can be relaxed. Further, since the optical coupler 44 (see FIG. 10) upstream of the EDF 45 in the main optical path is unnecessary in this preferred embodiment, loss of the input signal light to be supplied to the EDF 45 can be reduced to thereby obtain a good noise figure.

However, since the propagation direction of the signal light in the EDF 45 is opposite to the propagation direction of the probe light, a spatial population inversion condition in the EDF 45 becomes different from an intended power distribution of the signal light to be amplified, so that it may be difficult to make the gain characteristics flat over a wide band by the above-illustrated computation. In the case that such a difficulty is expected, it can be removed by finely correcting the power of the probe light according to the power of the input signal light. For example, in the optical amplifier shown in FIG. 11, a data table of optimum powers of the probe light corresponding to the powers of the input signal light may be preliminarily stored in the memory circuit 86, and the probe light may be controlled according to this data table.

While the optical amplifiers according to the first aspect of the present invention described above are suitable for transmission of WDM signal light consisting of a plurality of wavelength-division multiplexed optical signals, the application of the optical amplifiers is not limited to a WDM system. Also in the case of amplifying signal light having a single wavelength, the flat gain characteristics can eliminate a degradation in transmission characteristics due to wavelength fluctuations.

An optical amplifier suitable for limited application to a WDM system will now be described.

Figure 12:
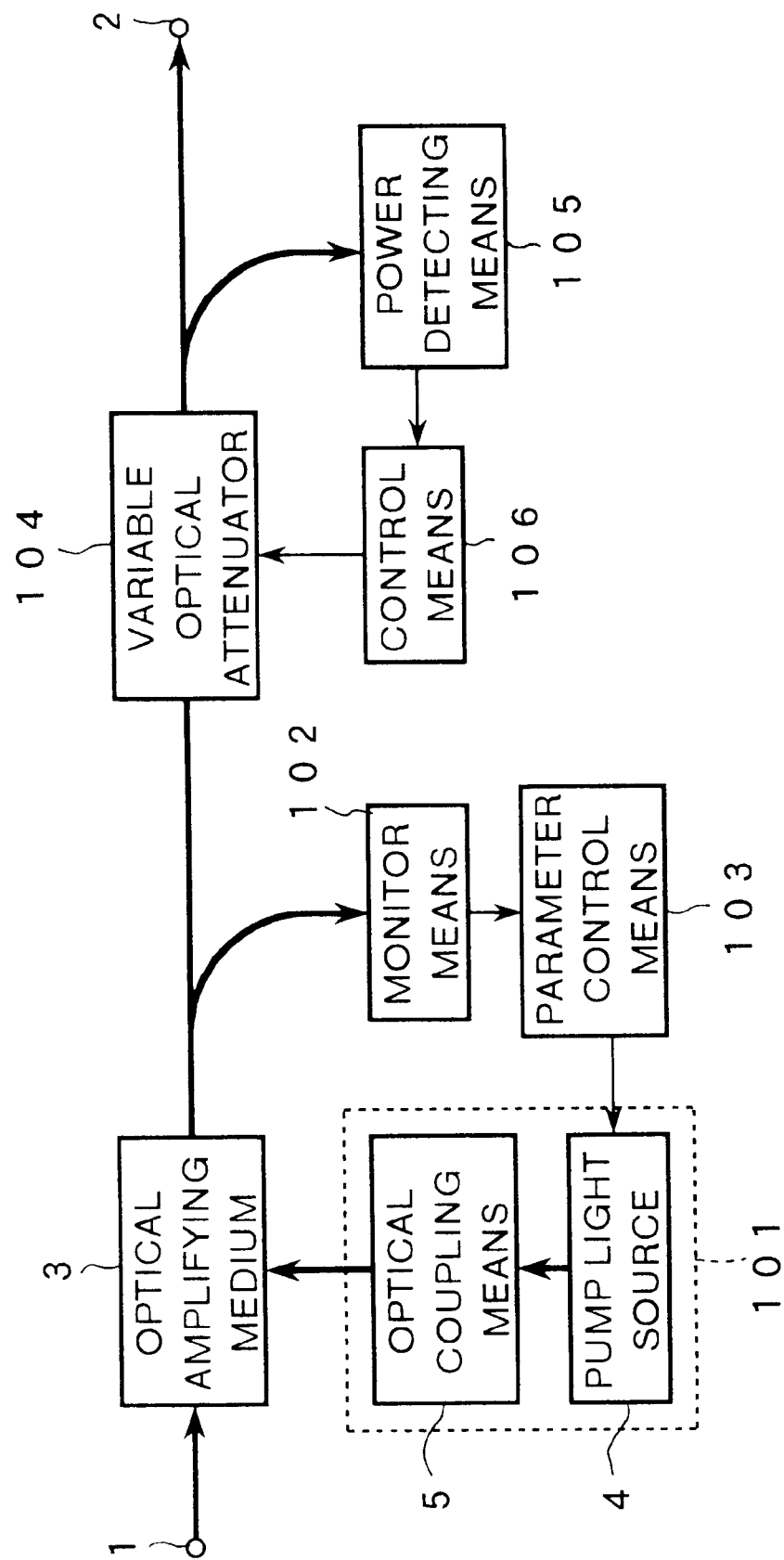
FIG. 12 is a block diagram for illustrating a basic configuration of an optical amplifier according to the second aspect of the present invention.

FIG. 12 is a block diagram for illustrating a basic configuration of an optical amplifier according to the second aspect of the present invention. This optical amplifier amplifies WDM signal light supplied to an input port 1 and outputs amplified WDM signal light from an output port 2. To amplify the WDM signal light, this optical amplifier includes an optical amplifying medium 3 and means 101 for pumping the optical amplifying medium 3. This optical amplifier further includes monitor means 102 for detecting a spectrum of the amplified WDM signal light output from the optical amplifying medium 3, and parameter control means 103 for controlling a parameter on which the gain characteristics of the optical amplifying medium 3 is dependent, according to the detected spectrum to make flat the gain characteristics in a band including the wavelengths of the WDM signal light. The pumping means 101 includes, for example, a pump light source 4 for outputting pump light and optical coupling means 5 for introducing the pump light into the optical amplifying medium 3. In this case, the power of the pump light may be adopted as the parameter to be controlled by the parameter control means 103.

In the case that the parameter to be controlled is the power of the pump light, this optical amplifier preferably further includes a variable optical attenuator 104 to which the amplified WDM signal light output from the optical amplifying medium 3 is supplied, power detecting means 105 for detecting the power of light output from the variable optical attenuator 104, and means 106 for controlling the attenuation factor of the variable optical attenuator 104 so that the detected power becomes constant. In the optical amplifier shown in FIG. 12, the parameter to be controlled by the parameter control means 103 is the power of the pump light, so that the variable optical attenuator 104 is used to perform APC. However, the basic configuration of the optical amplifier according to the second aspect of the present invention is not limited to that shown in FIG. 12. For example, a probe light source may be used like in the optical amplifier according to the first aspect of the present invention, and the power of probe light from the probe light source may be adopted as the parameter to be controlled by the parameter control means 103. In this case, APC may be performed by using the power of the pump light.

Figure 13:
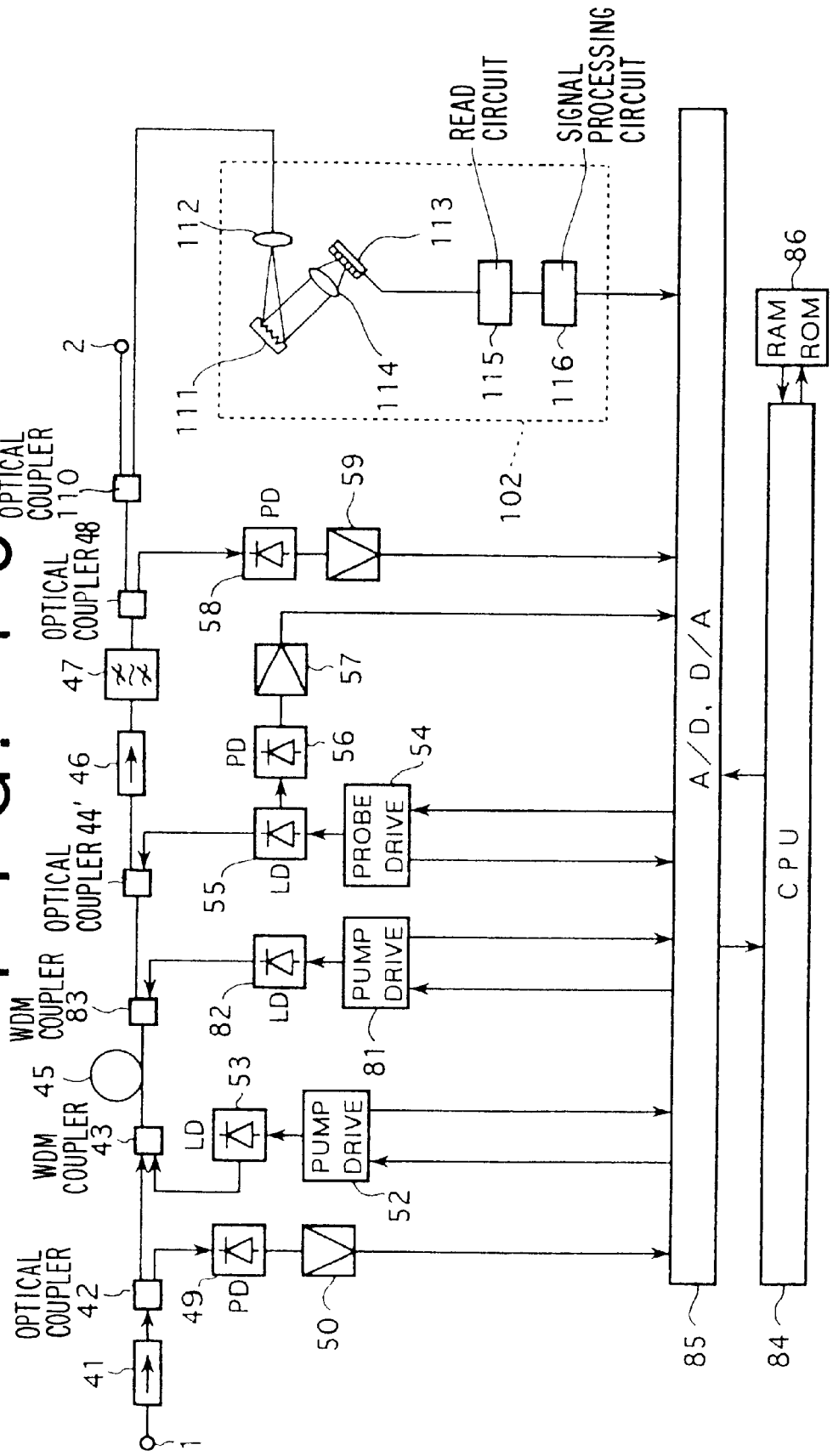
FIG. 13 is a block diagram of an optical amplifier showing a first preferred embodiment of the basic configuration shown in FIG. 12.

FIG. 13 is a block diagram of an optical amplifier showing a first preferred embodiment of the basic configuration shown in FIG. 12. This optical amplifier includes the hardware used in the preferred embodiment shown in FIG. 11, and the programs in the CPU 84 and the memory circuit 86 have been modified according to the second aspect of the present invention. This optical amplifier further includes an optical coupler 110 provided between the optical coupler 48 and the output port 2 in the main optical path, and monitor means 102.

The optical coupler 110 branches the WDM signal light amplified in the EDF 45 into first branch light and second branch light. The first branch light is output from the output port 2, and the second branch light is supplied to the monitor means 102. The parameter to be controlled by the parameter control means 103 (see FIG. 12) is the power of the probe light output from the laser diode 55, and the pump light output from the laser diodes 53 and 55 is used for APC. The parameter control means 103 is understood to be included in the CPU 84. The monitor means 102 includes a grating 111, a lens 112 for converting a beam parameter of the second branch light from the optical coupler 110 and directing the beam onto the entire surface of the grating 111, a photosensor array 113 having a plurality of photosensing elements, and a lens 114 for converging diffracted light from the grating 111 to a photosensing surface of the photosensor array 113.

Diffraction angles on the grating 111 are different according to wavelengths. Therefore, by using an optical power distribution obtained in the photosensor array 113 according to the difference in diffraction angle, the spectrum of the WDM signal light can be detected. The optical power distribution obtained in the photosensor array 113 is read by a read circuit 115, and an output signal from the read circuit 115 is converted into a form that can be easily handled by a signal processing circuit 116. Thereafter, an output signal from the signal processing circuit 116 is supplied through the converter 85 to the CPU 84 or supplied directly to the CPU 84. The signal processing circuit 116 calculates the values of spectrum peaks corresponding to all the channels of the WDM signal light, for example. In this case, the CPU 84 controls the power of the probe light so that the heights of the spectrum peaks become substantially equal to each other, for example.

Figure 14:
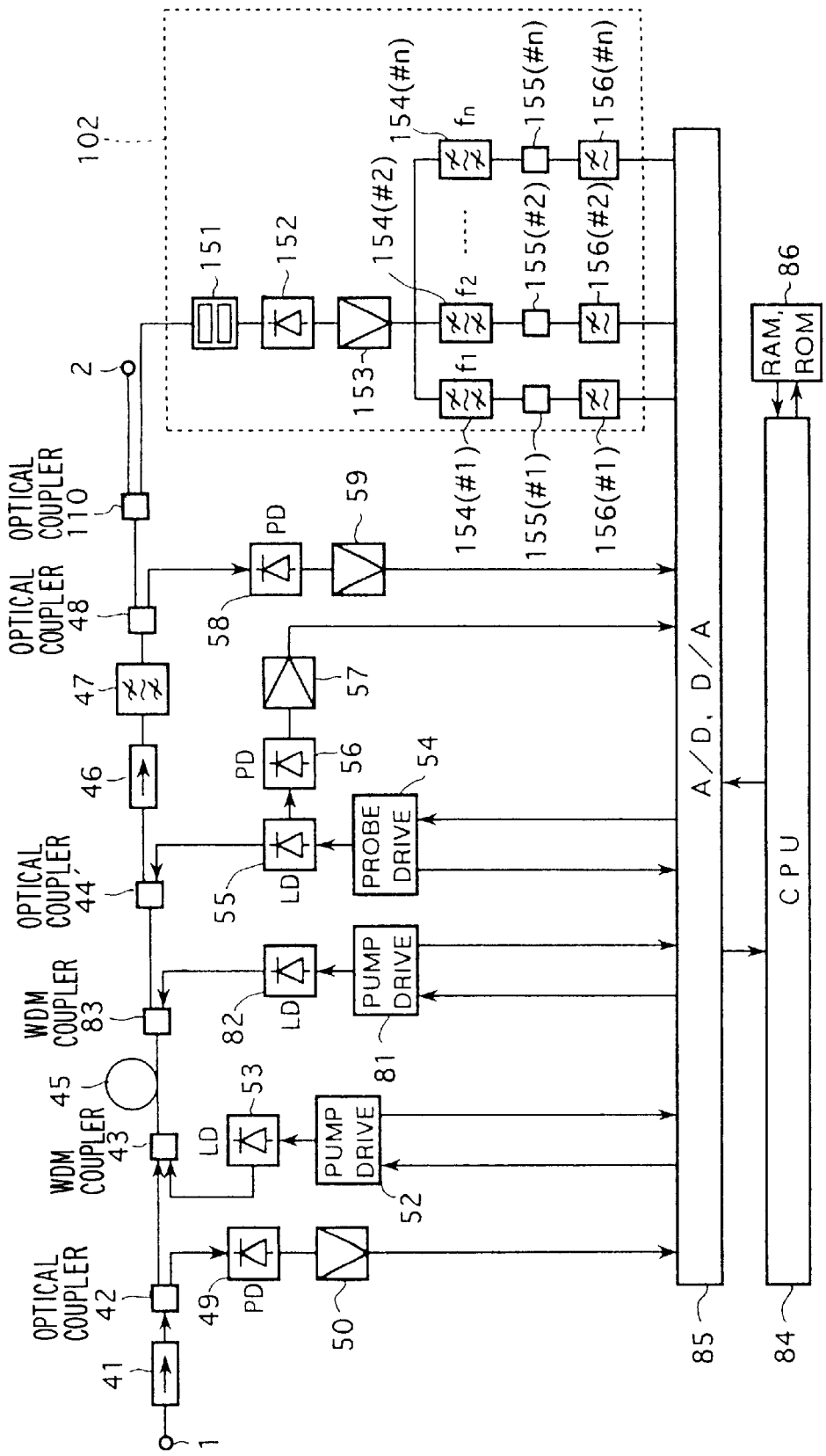
FIG. 14 is a block diagram of an optical amplifier showing a second preferred embodiment of the basic configuration shown in FIG. 12.

FIG. 14 is a block diagram of an optical amplifier showing a second preferred embodiment of the basic configuration shown in FIG. 12. This optical amplifier is applicable to the optical communication system according to the present invention. In contrast with the preferred embodiment shown in FIG. 13, the optical amplifier shown in FIG. 14 is characterized in that the monitor means 102 and the parameter control means 103 (see FIG. 12) are different in configuration and operation. The detail of this preferred embodiment will be hereinafter described.

Figure 15:
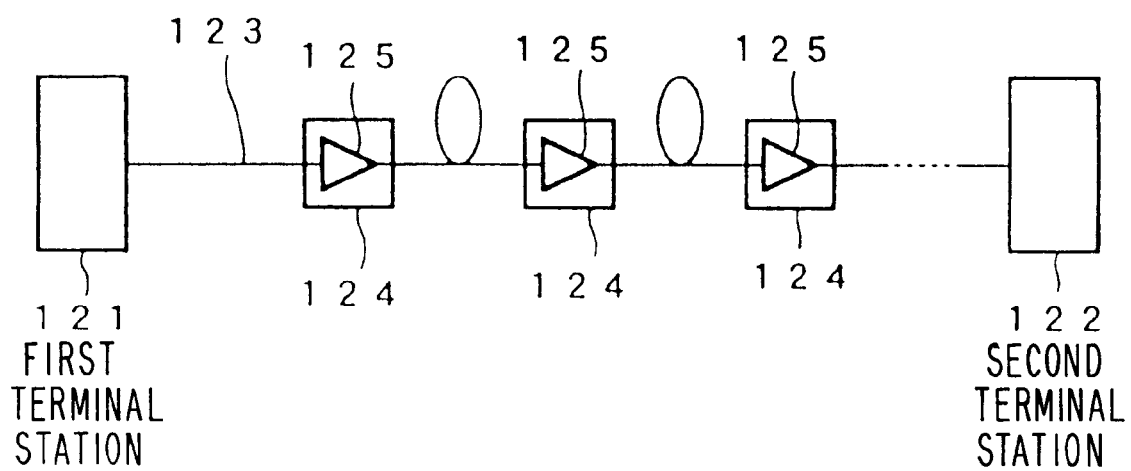
FIG. 15 is a block diagram of an optical communication system according to the present invention.

FIG. 15 is a block diagram of the optical communication system according to the present invention. This system includes a first terminal station 121, a second terminal station 122, an optical transmission line 123 such as an optical fiber laid between the first and second terminal stations 121 and 122, and a plurality of optical repeaters 124 inserted in the optical transmission line 123. Each of the optical repeaters 124 includes an optical amplifier 125 (e.g., the optical amplifier shown in FIG. 14) according to the second aspect of the present invention. The first terminal station 121 outputs WDM signal light. Each optical repeater 124 receives the WDM signal light to amplify it and output the amplified WDM signal light. The WDM signal light relayed by each optical repeater 124 is received by the second terminal station 122.

The first terminal station 121 includes means for modulating at least two channels of the WDM signal light by pilot signals having different frequencies. In each optical amplifier 125, the monitor means 102 (see FIG. 12) includes means for detecting components corresponding to the pilot signals, and the parameter control means 103 (see FIG. 12) includes means for controlling a parameter so that the amplitudes of the detected components become substantially equal to each other.

Figure 16:
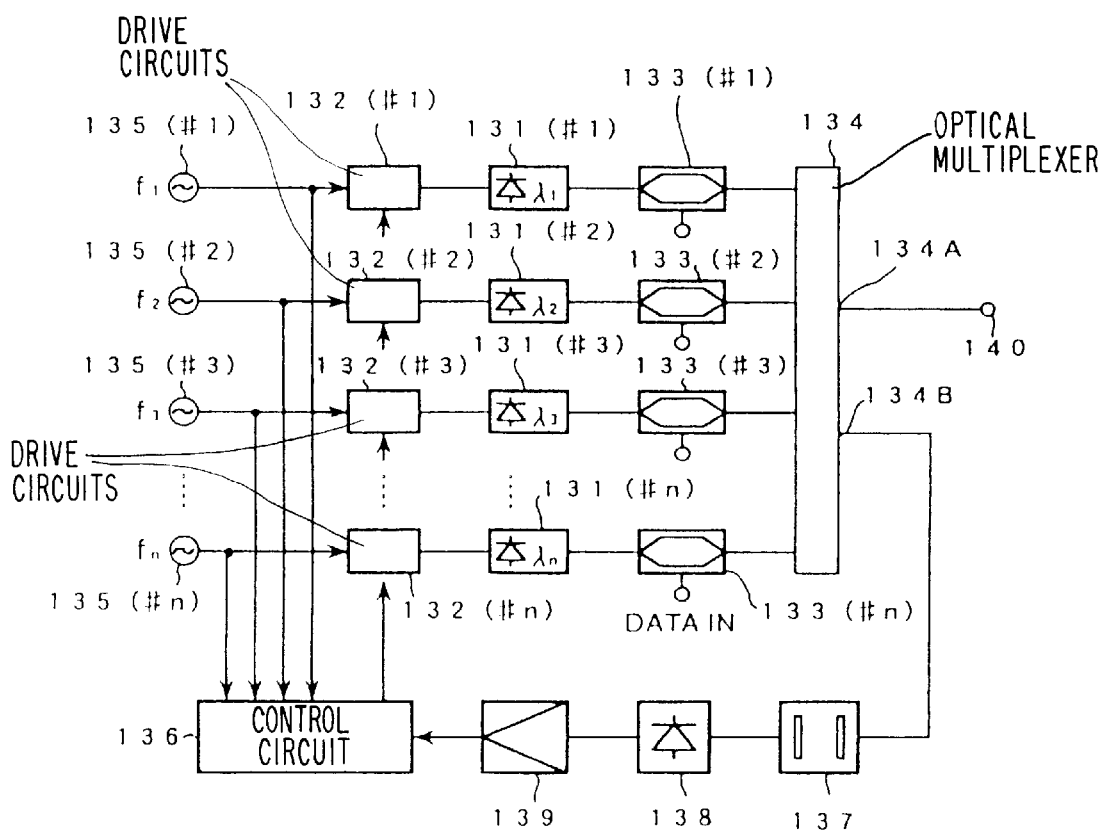
FIG. 16 is a block diagram showing a preferred embodiment of a first terminal station.
Figure 17:
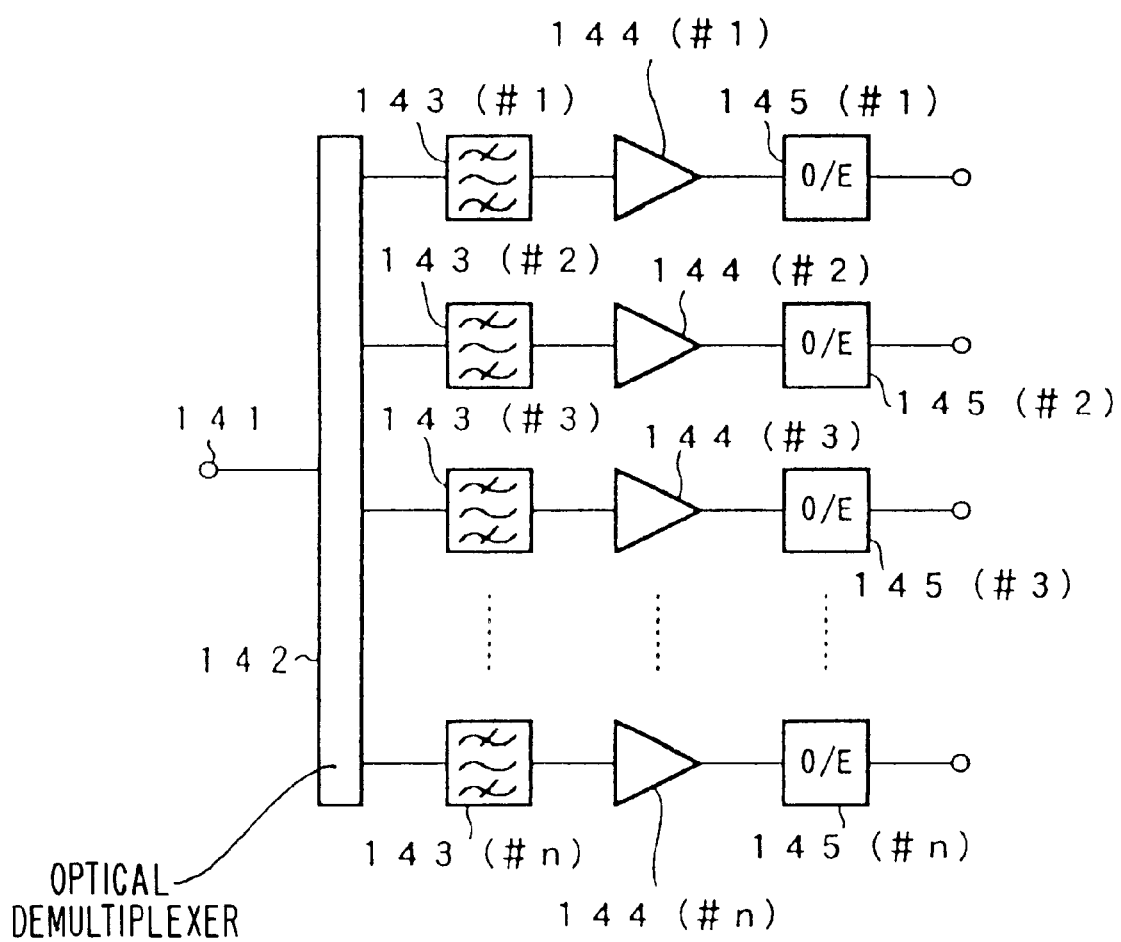
FIG. 17 is a block diagram showing a preferred embodiment of a second terminal station.

FIGS. 16 and 17 are block diagrams showing preferred embodiments of the first terminal station 121 and the second terminal station 122, respectively.

In the first terminal station 121, laser diodes 131 (#1 to #n) as transmission light sources are driven by drive circuits 132 (#1 to #n), respectively. The laser diodes 131 (#1 to #n) output optical signals having different wavelengths $\lambda_1$ to $\lambda_n$, respectively. These output signals are modulated according to transmission data by external modulators 133 (#1 to #n) suitable for high-speed transmission, respectively, and thereafter combined together by an optical multiplexer 134. The optical multiplexer 134 has two output ports 134A and 134B. Most of the combined optical signals (WDM signal light) is transmitted from the output port 134A through an output port 140 of this terminal station 121 to the optical transmission line 123 (see FIG. 15). The modulation according to the transmission data by the external modulators 133 (#1 to #n) is intensity modulation in this preferred embodiment. Oscillators 135 (#1 to #n) generate pilot signals (tone signals) having different frequencies $f_1$ to $f_n$, respectively. The pilot signals are supplied to the drive circuits 132 (#1 to #n), respectively, thereby frequency modulating the laser diodes 131 (#1 to #n) at the frequencies $f_1$ to $f_n$, respectively. The pilot signals are supplied also to a control circuit 136 having a synchronous detecting circuit.

A part of the WDM signal light output from the output port 134B of the optical multiplexer 134 is supplied through a frequency discriminator 137 such as a Fabry-Perot interferometer to a photodetector 138. By passing the WDM signal light through the frequency discriminator 137, an output from the photodetector 138 shows components of the pilot signals. The components are next amplified by an amplifier 139 to be supplied to the control circuit 136. The control circuit 136 controls drive currents to be supplied from the drive circuits 132 (#1 to #n) to the laser diodes 131 (#1 to #n) in accordance with the principle of general synchronous detection, thereby stabilizing the wavelengths of optical signals to be output from the laser diodes 131 (#1 to #n). The frequencies of the pilot signals are set to different values in a band of 1 KHz to 10 KHz, for example, so that they have no influence upon main signals according to the transmission data, and the pilot signals can be easily detected.

As shown in FIG. 17, the second terminal station 122 has an input port 141 for receiving the WDM signal light. The WDM signal light received is branched into a plurality of optical signals corresponding to the channels of the WDM signal light by an optical demultiplexer 142. Then, the optical signals from the optical demultiplexer 142 are supplied to optical band-pass filters 143 (#1 to #n), respectively. The optical band-pass filters 143 (#1 to #n) selectively transmit optical signals having the wavelengths $\lambda_1$ to $\lambda_n$, respectively. The optical signals passed through the optical band-pass filters 143 (#1 to #n) are amplified by optical amplifiers 144 (#1 to #n), respectively, and converted into electrical signals by opto-electric converters 145 (#1 to #n) including photodetectors, respectively. Then, the transmission data in all the channels are regenerated according to these electrical signals.

An optical amplifier applicable to each optical repeater 124 shown in FIG. 15 will now be described with reference to FIG. 14. A part of the amplified WDM signal light branched by the optical coupler 110 is supplied to the monitor means 102 for detecting the spectrum of the WDM signal light. The WDM signal light supplied to the monitor means 102 is supplied through a frequency discriminator 151 such as a Fabry-Perot interferometer to a photodetector 152. By passing the WDM signal light through the frequency discriminator 151, an output signal from the photodetector 152 shows components of the pilot signals. The components are amplified by an amplifier 153 and then supplied to band-pass filters 154 (#1 to #n). The band-pass filters 154 (#1 to #n) selectively transmit signal components having frequencies $f_1$ to $f_n$, respectively. The signal components passed through the band-pass filters 154 (#1 to #n) include the modulated components according to the relatively high-speed transmission data and the components based on the relatively low-speed pilot signals. To detect the amplitudes of the components based on the pilot signals, envelope detectors 155 (#1 to #n) are provided. Output signals from the envelope detectors 155 (#1 to #n) are supplied through low-pass filters 156 (#1 to #n), respectively, to the converter 85.

The CPU 84 including the function of the parameter control means 103 (see FIG. 12) controls the power of the probe light so that the amplitudes of the components corresponding to the pilot signals detected by the monitor means 102 become substantially equal to each other or in a predetermined relation. Accordingly, flat gain characteristics of the optical amplifier can be obtained. Particularly in the case that the system includes a plurality of optical repeaters 124 as shown in FIG. 15, degradation in transmission quality due to unflatness of gain characteristics becomes remarkable. Accordingly, the improvement in gain characteristics of an optical amplifier according to the present invention is effective for such a system.

In the configuration of the first terminal station 121 shown in FIG. 16, the pilot signals are used also for stabilization of the wavelengths of the optical signals. Therefore, the optical signals in all the channels are modulated by the pilot signals. However, if only flattening of the gain characteristics in the optical amplifier is intended, the optical signals in only two channels of the WDM signal light may be modulated by the pilot signals. For example, the two channels are a channel of the shortest wavelength and a channel of the longest wavelength in the WDM signal light.

Further, while the optical signals are frequency modulated by the pilot signals in the preferred embodiment shown in FIG. 16, the optical signals may be intensity modulated by the pilot signals in the case that the pilot signals are lower in speed than the transmission data. In the case that the transmission light sources are laser diodes in general, frequency modulation of the optical signals can be easily carried out by superimposing the pilot signals on the drive currents for the laser diodes. It should be noted that the optical signals are intensity modulated at the same time. In the case that the optical signals are intensity modulated by the pilot signals, the frequency discriminator 151 in the monitor means 102 shown in FIG. 14 is unnecessary.

As described above, according to the present invention, it is possible to provide an optical amplifier and an optical communication system which can reduce the wavelength dependence of gain irrespective of a change in input power and number of WDM channels.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier having an amplification band for input signal light, for outputting amplified signal light, comprising:

an optical amplifying medium to which said input signal light is supplied;

a pump light source outputting pump light;

first optical coupling means operatively connected to said optical amplifying medium and said pump light source, for introducing said pump light into said optical amplifying medium;

a probe light source outputting probe light having a wavelength included in said amplification band;

second optical coupling means operatively connected to said optical amplifying medium and said probe light source, for introducing said probe light into said optical amplifying medium;

first power detecting means for detecting power of said input signal light;

second power detecting means for detecting power of said probe light; and control means for controlling the power of said probe light according to outputs from said first and second power detecting means to maintain constant an amplifier gain for said input signal light.

2. An optical amplifier according to claim 1, wherein said input signal light comprises a plurality of wavelength-division multiplexed optical signals.

3. An optical amplifier according to claim 1, further comprising:

third power detecting means for detecting power of said amplified signal light; and means for controlling power of said pump light so that an output from said third power detecting means becomes constant.

4. An optical amplifier according to claim 3, wherein said third power detecting means comprises:

an optical band-pass filter operatively connected to said optical amplifying medium, transmitting said amplified signal light and substantially cutting off said probe light;

means for branching said amplified signal light output from said optical band-pass filter into first branch light and second branch light; and a photodetector receiving said first branch light and outputting an electrical signal corresponding to power of said first branch light received;

said second branch light being output from said optical amplifier.

5. An optical amplifier according to claim 1, wherein said first power detecting means comprises means operatively connected to said first optical coupling means, for branching said input signal light into first branch light and second branch light; and a first photodetector receiving said first branch light and outputting an electrical signal corresponding to power of said first branch light received; said second branch light being supplied to said optical amplifying medium;

said probe light source comprises a laser diode outputting forward light and backward light, said forward light being supplied to said optical amplifying medium; and said second power detecting means comprises a second photodetector receiving said backward light and outputting an electrical signal corresponding to power of said backward light received.

6. An optical amplifier according to claim 1, wherein said control means comprises:

computing means operatively connected to said first and second power detecting means, for performing computation based on outputs from said first and second power detecting means and outputting a result of said computation; and means for controlling said probe light source so that said result output from said computing means becomes constant.

7. An optical amplifier according to claim 6, wherein said computing means adds a value obtained by multiplying the output from said first power detecting means by a first constant to a value obtained by multiplying the output from said second power detecting means by a second constant, and outputs a result of such addition.

8. An optical amplifier according to claim 6, wherein said control means further comprises means for correcting the power of said probe light according to the output from said first power detecting means to substantially widen a band where said amplifier gain does not change depending on wavelength.

9. An optical amplifier according to claim 1, wherein said control means includes:

an analog/digital converter converting outputs from said first and second power detecting means into digital signals; and a processor receiving said digital signals and calculating optimum power of said probe light in accordance with a predetermined program.

10. An optical amplifier according to claim 1, wherein:

said optical amplifying medium comprises a doped fiber doped with a rare earth element;

said doped fiber has a first end to which said input signal light is supplied and a second end outputting said amplified signal light.

11. An optical amplifier according to claim 10, wherein said rare earth element comprises erbium.

12. An optical amplifier according to claim 10, wherein said first optical coupling means comprises means for supplying said pump light to any one of said first end and said second end of said doped fiber.

13. An optical amplifier according to claim 10, wherein:

said pump light source comprises a first laser diode and a second laser diode;

said first optical coupling means comprises means for supplying light from said first laser diode to said first end of said doped fiber, and means for supplying light from said second laser diode to said second end of said doped fiber.

14. An optical amplifier according to claim 10, wherein said second optical coupling means comprises means for supplying said probe light to any one of said first end and said second end of said doped fiber.

15. An optical amplifier for amplifying wavelength-division multiplexed signal light and outputting amplified wavelength-division multiplexed signal light, comprising:

an optical amplifying medium to which said wavelength-division multiplexed signal light is supplied;

means for pumping said optical amplifying medium;

monitor means for detecting a spectrum of said amplified wavelength-division multiplexed signal light output from said optical amplifying medium; and parameter control means for controlling a parameter upon which gain characteristics representing a relation between gain of said optical amplifying medium and wavelength are dependent to maintain flat said gain characteristics in a band including wavelengths of said wavelength-division multiplexed signal light.

16. An optical amplifier according to claim 15, wherein:

said pumping means comprises a pump light source outputting pump light, and means for introducing said pump light into said optical amplifying medium; and said parameter is power of said pump light.

17. An optical amplifier according to claim 16, further comprising:
- a variable optical attenuator to which said amplified wavelength-division multiplexed signal light output from said optical amplifying medium is supplied;
- means for detecting power of light output from said variable optical attenuator; and
- means for controlling an attenuation factor of said variable optical attenuator so that the power detected by said detection means becomes constant.

18. An optical amplifier according to claim 15, further comprising:
- a probe light source outputting probe light having a wavelength included in an amplification band of said optical amplifying medium; and
- means for introducing said probe light into said optical amplifying medium;
- wherein said parameter is power of said probe light.

19. An optical communication system comprising:
- a first terminal station outputting wavelength-division multiplexed signal light;
- an optical repeater receiving said wavelength-division multiplexed signal light to amplify said wavelength-division multiplexed signal light received and to output amplified wavelength-division multiplexed signal light; and
- a second terminal station receiving said amplified wavelength-division multiplexed signal light output from said optical repeater;
- said first terminal station including means for modulating at least two channels of said wavelength-division multiplexed signal light by pilot signals having different frequencies;
- said optical repeater including an optical amplifier, said optical amplifier comprising;
  - an optical amplifying medium to which said wavelength-division multiplexed signal light is supplied;
  - means for pumping said optical amplifying medium;
  - monitor means for detecting a spectrum of said amplified wavelength-division multiplexed signal light output from said optical amplifying medium; and
  - parameter control means for controlling a parameter upon which gain characteristics representing a relation between gain of said optical amplifying medium and wavelength are dependent to maintain flat said gain characteristics in a band including wavelengths of said wavelength-division multiplexed signal light;
  - said monitor means including means for detecting components corresponding to said pilot signals;
  - said parameter control means comprising means for controlling said parameter so that amplitudes of said components detected by said detecting means become substantially equal to each other.

20. An optical communication system according to claim 19, wherein said first terminal station further includes means for stabilizing each wavelength of said wavelength-division multiplexed signal light according to said pilot signals.

21. An optical communication system according to claim 19, wherein said optical repeater comprises a plurality of optical repeaters connected in series.

22. An optical amplifier comprising:
- an optical amplifying medium supplied with an input signal light;
- means for pumping the optical amplifying medium by supplying the optical amplifying medium with a pump light such that the optical amplifying medium has an amplification band for the input signal light;
- means for supplying the optical amplifying medium with a probe light having a wavelength included in the amplification band;
- means for detecting a power of at least one of the input signal light and the probe light; and
- means for controlling the power of the probe light based on the detected power, so that the power of the probe light is controlled so as to maintain the wavelength dependence of gain constant.

23. An amplifier comprising:
- an optical amplifying medium carrying an input signal and pump light;
- a coupler to introduce a probe light into said optical amplifying medium;
- a power detector, coupled to said optical amplifying medium, to detect power of at least one of the probe light and the input signal; and
- a controller, coupled to said power detector, to control the power of the probe light based on the detected power, so that the power of the probe light is controlled so as to maintain the wavelength dependence of gain constant.

24. A method for controlling gain in an optical amplifier having an optical amplifying medium carrying an input signal and pump light, comprising:
- introducing a probe light into the optical amplifying medium;
- detecting power of at least one of the probe light and the input signal; and
- controlling the power of the probe light based on the detected power, so that the power of the probe light is controlled so as to maintain the wavelength dependence of gain constant.

25. An optical amplifier comprising:
- a pumped optical amplifying medium carrying a wavelength-division multiplexed signal light;
- a detector to detect a spectrum of the wavelength-division multiplexed signal light; and
- a parameter controller controlling a parameter upon which gain characteristics representing a relation between gain of said optical amplifying medium and wavelength are dependent, to maintain flat the gain characteristics in a band including wavelengths of the wavelength-division multiplexed signal light.

26. A method for controlling an optical amplifier having an optical amplifying medium carrying a wavelength-division multiplexed signal light, comprising:
- pumping the optical amplifying medium;
- detecting a spectrum of the amplified wavelength-division multiplexed signal light carried by the optical amplifying medium; and
- controlling a parameter upon which gain characteristics representing a relation between gain of said optical amplifying medium and wavelength are dependent, to maintain flat the gain characteristics in a band including wavelengths of the wavelength-division multiplexed signal light.

27. An optical communications system comprising:
- a first terminal station outputting wavelength-division multiplexed signal light;
- an optical repeater coupled to said first terminal station, to receive the wavelength-division multiplexed signal light and to output amplified wavelength-division multiplexed signal light; and a second terminal station coupled to said optical repeater, to receive the amplified wavelength-division multiplexed signal light;

said optical repeater including an optical amplifier having:
- a pumped optical amplifying medium to receive the wavelength-division multiplexed signal light;
- a monitor to detect a spectrum of the wavelength-division multiplexed signal light; and
- a parameter controller controlling a parameter upon which gain characteristics representing a relation between gain of said optical medium and wavelength are dependent to maintain flat the gain characteristics in a band including wavelengths of the wavelength-division multiplexed signal light.

28. An optical communications method comprising:

outputting a wavelength-division multiplexed signal light from a first terminal station;

receiving the wavelength-division multiplexed signal light at an optical repeater having an optical amplifying medium to carry the wavelength-division multiplexed signal light;

pumping the optical amplifying medium;

detecting a spectrum of the wavelength-division multiplexed signal light carried by the optical amplifying medium;

controlling a parameter upon which gain characteristics representing a relation between gain of the optical amplifying medium and wavelength are dependent, to maintain flat the gain characteristics in a band including wavelengths of the wavelength-division multiplexed signal light; and outputting an amplified wavelength-division multiplexed signal light to a second terminal station.

* * * * *